W. AVERY.
TAPER ATTACHMENT FOR LATHES.
APPLICATION FILED JUNE 16, 1921.

1,427,510.

Patented Aug. 29, 1922.

INVENTOR:
William Avery.
by Macleod, Calm Copeland & Dike
ATTYS

UNITED STATES PATENT OFFICE.

WILLIAM AVERY, OF FOXBORO, MASSACHUSETTS.

TAPER ATTACHMENT FOR LATHES.

1,427,510.  Specification of Letters Patent.  Patented Aug. 29, 1922.

Application filed June 16, 1921. Serial No. 478,150.

*To all whom it may concern:*

Be it known that I, WILLIAM AVERY, a citizen of the United States, residing at Foxboro, county of Norfolk, State of Massachusetts, have invented a certain new and useful Improvement in Taper Attachments for Lathes, of which the following is a specification, reference being had therein to the accompanying drawings.

The invention relates to a taper finding attachment for lathes. The object of the invention is to provide a device for use in adjusting a lathe to cause the tool to cut or turn a piece of work to any desired angle of taper, and which can also be used for finding the taper of a piece of work which has already been turned.

The invention will be fully understood from the following description when taken in connection with the accompanying drawings, and the novel features thereof will be pointed out and clearly defined in the claims at the close of this specification.

In the drawings, Fig. 1 is a plan view of a device embodying the invention.

Figure 3:
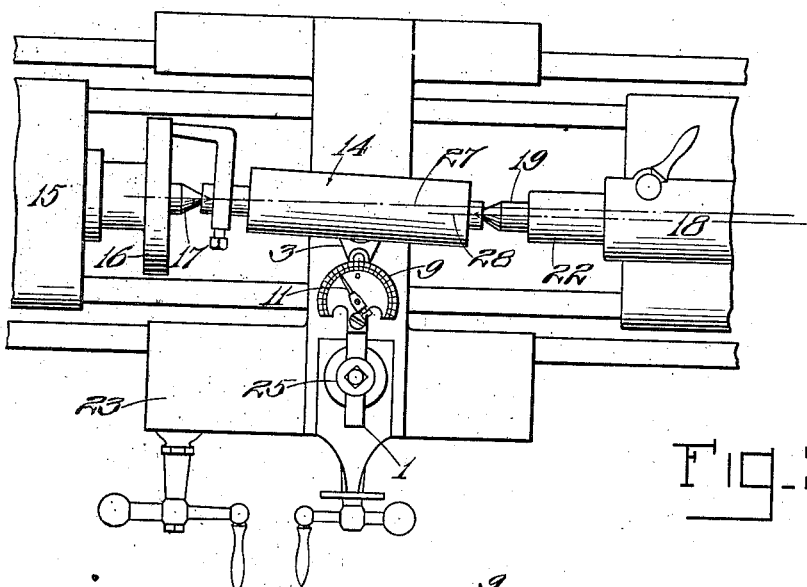
Fig. 3 is a plan view of a lathe having the device connected with the tool post showing its use in adjusting the tool post and centers of a lathe to turn a piece of work to a particular angle of taper.

Referring now to the drawings, 1 represents a bar of metal which constitutes a holder for the attachment of the other parts of the device, said bar of metal being shaped suitable to form a stock to fit in the tool post of the lathe in place of the cutting tool while adjusting the lathe. The holder is formed with a slot 2 extending longitudinally in from one end of the holder and has journalled therein a block 3 which is inserted between the cheeks of the slot and is mounted on a pivot 5 which is journalled in bearings in the cheeks of the slot. The said block 3 has at its outer end flat surfaces 4—4, which are in the same plane with each other to form a straight edge for engagement with the work. In the drawings, the intermediate portion 20 between the straight surfaces 4—4 is shown as slightly concaved for convenience in applying it to a piece of work in which there may be a protuberance which will be straddled by the straight edge portions 4—4, but the two portions 4—4 being in the same plane with each other both of said portions 4—4 will rest on a plane surface at the same time, and these two portions 4—4 will hereinafter be referred to as the straight edge. The block 3 is shown with rearwardly tapering side edges 21—21, this being the preferred form of construction, although not essential.

The said block 3 which is preferably made of steel is mounted on the end of an arm 6 of a segment gear 7 which engages with a pinion 8, said pinion 8 being mounted on a shaft 10 which is journalled in the cheeks of the said slot 2.

A dial 9 is secured to the front face of the holder 1 in a plane parallel with the segment gear 7 and block 3. This dial plate is graduated to the right and left from the middle of the arc-shaped periphery; that is, it is marked zero at the point which is in the median line. It is shown on the scale as graduated from 1 to 12 to the right and left of said middle or zero point, these graduations being fixed so as to indicate the inclination or taper, that is, the fractional part of an inch or number of inches to the foot of the article whose inclination or taper is to be determined, or it may be graduated in degrees.

The shaft 10 on which the pinion 8 is mounted extends outwardly through an aperture in the front cheek of the slot 2 and through the center of the curvature of the periphery of the dial 9. Said shaft turns loosely in the aperture in the dial through which it passes. On the outer end of the shaft 10 is mounted a pointer 11 so that when the said shaft 10 is rotated the end of the pointer will swing around on the scale on the dial plate. A spring 12 is coiled around the shaft 10, one end of the spring being connected with the shaft 10 and the other end being secured to the cheek of the slot 2. The said spring is under tension so as to take up the lost motion on the pinion and also to normally hold the shaft in a position for the pointer 10 to be held back against a stop pin 13, as shown in Figure 1 to limit the turning of the pointer.

Figure 1:
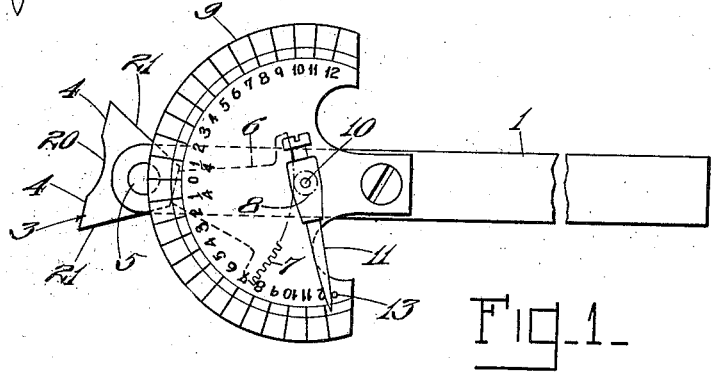
Figure 2:
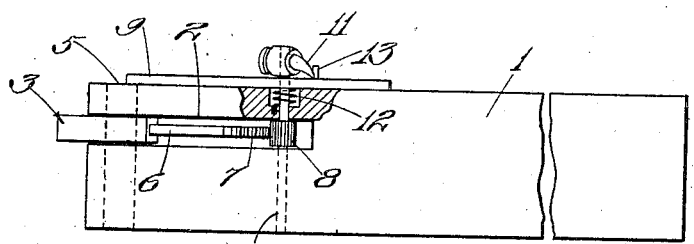
Fig. 2 is a side elevation partly in section of the device shown in Fig. 1.

The pinion 8 being mounted fast on the said shaft 10 and being in engagement with the segment gear 7, this also normally holds the segment gear 7 in the position shown in Figure 1, so that the straight edge 4 of the block 3 will be inclined at an angle to the axis of the holder stock 1 to the same degree indicated by the pointer. If the straight edge 4—4 is held firmly up against a surface which is at right angles to the longitudinal axis of the holder 1, so that the entire straight edge is in contact with the plane surface against which it is held, then this will cause the block 3 to turn on its pivot from the position shown in Figure 1 so that the straight edge is at right angles to the longitudinal axis of the block 1. The segment gear 7 will turn at the same time with the block 3 and turn the pinion 8 against the tension of the spring far enough to bring the pointer 11 around to zero on the dial and pointing in a line which is parallel to the longitudinal axis of the holder 1.

If the straight edge 4—4 is placed against a surface which is inclined or tapered with relation to the axis of the holder 1 and pressed firmly against it, then the segment gear 7 will be turned more or less according to the angle of inclination and the pointer 11 will point to the proper figure on the dial to indicate the amount of taper to the foot. The figures on the dial as shown are intended to represent graduations of ¼ of an inch taper to the foot. If, therefore, the indicator points to the figure 1 on the dial, it will mean that the article whose taper is being determined in tapered ¼ of an inch to the foot. If it points to 6 it will indicate that the article is tapered 6/4, that is 1½ inches to the foot.

The method employed in applying the device to aid in adjusting the lathe to turn down a cylindrical rod to a certain taper, is illustrated in Figure 3, in which 15 represents the head stock having a face plate 16 and a live center 17, a tail stock 18 having a dead center 19 and a spindle 22 and having a carriage 23, all of well-known construction. The tail stock is adjustable and the carriage is provided with means for moving it longitudinally and transversely in well-known manner. The carriage is provided with a tool post 25.

Now in adjusting the lathe so as to turn a cylindrical piece of work 14 to a certain angle of taper, as for instance one inch to the foot, the holder is inserted in the tool post and the carriage is moved over towards the right from the position in which the carriage is shown in Figure 3. The holder in the tool post is then moved out far enough to bring the straight edge up against the spindle 22 and pressed against the spindle until the indicator points to zero. The tool post is then clamped in the carriage in the position to which it has been adjusted in bringing the pointer to zero. The carriage is then moved into position between the centers as shown in Figure 3 and the work is inserted between the centers 17 and 19. Then the finder is moved up against the side of the work and while the straight edge is pressed against the work the tail stock is moved over far enough for the pointer to indicate 4 on the dial, as shown in Figure 3. The tail stock is then clamped in this position, the carriage is moved back, the finder holder is removed from the tool post and the tool itself is then inserted and clamped in the tool post, and then the carriage is moved forward to bring the tool up against the work. The parts will then be in position so that the tool will turn the work to the taper as previously indicated on the dial of the finder, namely one inch to the foot. The offset of the dead center is indicated by the distance between the lines 27 and 28.

Figure 4:
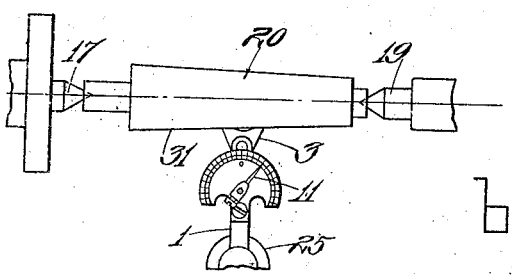
Fig. 4 is a plan view illustrating the use of the device in determining the taper of a piece of work which has already been turned.

The method of application to determine the taper of a piece of work already turned down is illustrated in Figure 4, in which the tapered piece of work 20 is mounted between the two centers 17 and 19 of the lathe, the tail stock 18 being for this purpose first adjusted so that the axes of the two spindles are in exact alignment with each other. The holder 1 of the finder is mounted in the tool post with its axis at right angles to the axis of the two spindles 17 and 19. The carriage is then moved up to bring the straight edge of the block 3 pressed firmly against the inclined or tapered side 31 and the pointer 11 will swing over to indicate on the dial the exact amount of taper.

The device can also be employed to set the centers in alignment if they are out of alignment. This can be done by applying it to a straight sided bar. This also is illustrated in Figure 3, which shows that the centers then are four points out of alignment. While the dial in the drawings is shown and described as graduated to denote the taper according to the number of quarter inches to the foot, it is obvious that it can be graduated as fine as desired, and also that it can be graduated by degrees like a protractor instead of by rule measurement.

What I claim is:—

1. A taper finder for indicating the degree of taper of an article, comprising an elongated holder, a graduated scale and indicator mounted on said holder, a movable straight edge member mounted on said holder, a spring which normally retains the straight edge at a certain angle with relation to the axis of the holder, and means connecting said movable member with said indicator, whereby when said straight edge is pressed against a tapered surface and the holder is maintained with its longitudinal axis at right angles to the longitudinal axis of said tapered article, the said indicator will be moved to indicate on the scale the degree of taper.

2. A taper finder for indicating the degree of taper of an article, comprising an elongated holder, a graduated scale mounted thereon having a movable indicator, a movable straight edge member pivoted to said holder and connected to said indicator in such manner that the rotation of said pivoted member actuates the said indicator, a spring which normally retains the pivoted straight edge member at a certain angle with relation to the axis of the holder, and all so constructed and arranged that when the said straight-edge is pressed against a tapered surface while the holder is maintained in a certain position, the indicator will denote on the scale the degree of taper of said article whose taper is to be determined.

3. A taper finder for lathes comprising an elongated holder, a straight-edged member pivoted therein, a graduated scale attached to said holder and having an indicator, a spring which normally holds said straight-edged member in such position that the straight edge will be in a line at an acute angle to a plane which is at right angles to the longitudinal axis of the said holder, and which yields to permit the said straight edge to be brought into a plane at right angles to the longitudinal axis of said holder when said straight edge is pressed against a surface which is at right angles to the longitudinal axis of said holder, the said indicator being thereby moved to indicate on the scale the relative degree of inclination of said surface against which the straight edge is pressed.

4. A taper finder for lathes comprising an elongated holder constructed and adapted to be inserted in the tool post of a lathe, a graduated scale attached to said holder and having an indicator, said holder being slotted and having pivotally mounted in the cheeks of the slot a swinging member having on the outer end a straight edge, said straight-edged member being so constructed and mounted with relation to the scale and indicator that when the straight-edged member is presented against a surface which is at right angles to the longitudinal axis of the said holder, the said indicator will point to zero, and when the straight edge is presented against a tapered surface it will cause the said indicator to point to markings on the scale which will indicate the degree of taper of said tapered surface.

5. A taper finder for lathes comprising an elongated holder, a straight-edged member pivoted therein, a graduated scale attached to said holder and having an indicator, a spring which normally holds said straight-edged member in such position that the straight edge will be in a line at an acute angle to a plane which is at right angles to the longitudinal axis of the said holder, and which yields to permit the said straight edge to be brought into a plane at right angles to the longitudinal axis of said holder when said straight edge is pressed against a plane surface which is at right angles to the longitudinal axis of said holder and to be brought into a plane of an intermediate angle to the longitudinal axis of said holder when said straight edge is pressed against a surface which is at an intermediate angle to the longitudinal axis of said holder, the said indicator being moved to indicate on the scale the relative degree of inclination of said surface against which the said straight edge is pressed.

6. A taper finder for lathes comprising an elongated holder, a straight-edged member pivoted therein, a graduated scale attached to said holder, a rotary shaft having a pointer which as the shaft is rotated points to different graduations on the scale, gear connection between the said indicator shaft and said straight-edged member, whereby the turning of the straight-edged member on its pivot turns the said indicator, the said scale being so arranged with relation to said straight-edged member that when the straight-edged member is pressed against the periphery of a tapered article the said indicator will be swung around to indicate on the scale the degree of taper of the said article to the longitudinal axis thereof.

7. A taper finder for lathes comprising an elongated holder constructed and adapted to be inserted in the tool post of a lathe, a graduated scale attached to said holder and having an indicator, said holder being slotted and having pivotally mounted in the cheeks of the slot a swinging member having on the outer end a straight edge, said straight-edged member being so constructed and mounted with relation to the scale and indicator that when the straight-edged member is presented against a surface which is at right angles to the longitudinal axis of the said holder, the said indicator will point to zero, and when the straight edge is presented against a tapered surface it will cause the said indicator to point to markings on the scale which will indicate the degree of taper of said tapered surface, and a spring which normally holds the said pivoted straight-edge member in a position for the straight edge to be inclined to the longitudinal axis of the said holder member.

8. A taper finder for lathes comprising an elongated holder stock constructed and adapted to be inserted in the tool post of a lathe, a graduated scale attached to said holder and having an indicator, said holder stock being slotted and having pivotally mounted in the cheeks of the slot a swinging member having on the outer end a straight edge and having on its inner end a segment gear, a shaft on which said indicator is mounted and having a pinion which is engaged with said segment gear, whereby when the said pivoted member is turned on its axis the said segment gear causes the turning of said pinion shaft and the movement of the said indicator, said straight-edged member being so constructed and mounted with relation to the scale and indicator that when the straight-edged member is presented against a surface which is at right angles to the longitudinal axis of the said holder stock, the said indicator will point to zero, and when the straight edge is presented against a tapered surface it will cause the said indicator to point to markings on the scale which will indicate the degree of taper of said tapered surface.

9. A taper finder for lathes comprising an elongated holder stock constructed and adapted to be inserted in the tool post of a lathe, a graduated scale attached to said holder and having an indicator, said holder stock being slotted and having pivotally mounted in the cheeks of the slot a swinging member having on the outer end a straight edge and having on its inner end a segment gear, a shaft on which said indicator is mounted and having a pinion which is engaged with said segment gear, whereby when the said pivoted member is turned on its axis the said segment gear causes the turning of said pinion shaft and the movement of the said indicator, said straight-edged member being so constructed and mounted with relation to the scale and indicator that when the straight-edged member is presented against a surface which is at right angles to the longitudinal axis of the said holder stock, the said indicator will point to zero, and when the straight edge is presented against a tapered surface it will cause the said indicator to point to markings on the scale which will indicate the degree of taper of said tapered surface, and a spring which normally holds the said pivoted, straight-edged member in a position for the straight edge to be inclined to the longitudinal axis of the said holder member.

10. A taper finder for use with lathes comprising an elongated holder constructed for detachable connection with the tool post of a lathe, a member pivotally mounted intermediate its ends in the said holder, one end of said pivot member projecting outside of the end of said holder and being formed with a straight edge, a segment gear on the other end of said pivot member, a pinion mounted on a shaft journalled in said holder and engaging with said segment gear, a dial plate mounted on the face of said holder having a graduated scale marked thereon, an indicator member mounted on said pinion shaft and turning therewith, the said indicator pointing to zero when the said straight edge is in a line at right angles to the longitudinal axis of the holder, a spring which normally holds the pinion shaft and pinion in such position on their axes that acting through the said segment gear the line of the said straight edge will be inclined to a line at right angles with the longitudinal axis of the holder, the said indicator being swung around to point to zero when the said straight edge is pressed against a straight surface which is at right angles to the longitudinal axis of the holder and being turned to an intermediate position on the dial when the surface pressed upon by the said straight edge is inclined with relation to the longitudinal axis of the holder, the scale being so graduated that such inclination will be indicated by the pointer and scale.

11. A taper finder for use with lathes comprising an elongated holder constructed for detachable connection with the tool post of a lathe, a member pivotally mounted intermediate its ends in the said holder, one end of said pivot member projecting outside of the end of said holder and being formed with a straight edge, a dial plate mounted on the face of said holder having a graduated scale marked thereon, an indicator member pointing to zero when the said straight edge is in a line at right angles to the longitudinal axis of the holder, a spring which normally holds the indicator in such position that the said straight edge will be inclined to a line at right angles with the longitudinal axis of the holder, the said indicator being swung around to point to zero when the said straight edge is pressed against a straight surface which is at right angles to the longitudinal axis of the holder and being turned to an intermediate position on the dial when the surface pressed upon by the said straight edge is inclined with relation to the longitudinal axis of the holder, the scale being so graduated that such inclination will be indicated by the pointer and scale.

In testimony whereof I affix my signature.

WILLIAM AVERY.